United States Patent [19]

Singh et al.

[11] Patent Number: 4,913,814

[45] Date of Patent: Apr. 3, 1990

[54] JET PUMP SYSTEM FOR FLUIDIC CONTACTOR CASCADE

[75] Inventors: Jaswant Singh, Forton; John W. Stairmand, Blackpool, both of United Kingdom

[73] Assignee: Secretary of State for United Kingdom Atomic Energy Authority, London, England

[21] Appl. No.: 310,051

[22] Filed: Feb. 10, 1989

[30] Foreign Application Priority Data

Feb. 11, 1988 [GB] United Kingdom ................. 8803138

[51] Int. Cl.⁴ .............................................. C02F 9/00
[52] U.S. Cl. .................................... 210/255; 210/258; 210/322; 210/512.2; 210/787; 137/809; 137/566
[58] Field of Search ...................... 210/512.2, 255, 294, 210/322, 788, 790, 416.1, 258, 787; 137/809, 810, 566; 417/313

[56] References Cited

U.S. PATENT DOCUMENTS

| | | | |
|---|---|---|---|
| 2,965,522 | 12/1960 | Crespin et al. | 210/512.2 |
| 3,188,974 | 6/1965 | Rosaen | 417/313 |
| 3,550,618 | 12/1970 | Roach | 137/566 |
| 4,015,628 | 4/1977 | Randolf | 137/566 |
| 4,676,809 | 6/1987 | Fjallstrom et al. | 210/512.2 |
| 4,693,822 | 9/1987 | Bowe et al. | 210/255 |
| 4,703,870 | 11/1987 | Sedam | 137/566 |
| 4,755,295 | 7/1988 | Donhauser et al. | 210/512.2 |
| 4,830,581 | 5/1989 | Hendricks | 137/566 |

FOREIGN PATENT DOCUMENTS 58-0207113 12/1983 Japan ................................. 137/566

Primary Examiner—Ricahrd V. Fisher
Assistant Examiner—Cynthia L. Nessler
Attorney, Agent, or Firm—King and Schickli

[57] ABSTRACT

In apparatus for mixing and then separating different flow streams, such as solvent extraction apparatus, a cascade of contactors and jet pumps are arranged in counter-current flow mode. The same one flow stream is applied to the drive port of each jet pump in the cascade and the other flow stream is applied to the suction port of each jet pump in the cascade. The jet pumps in the cascade increase in size from a high pressure to a low pressure end of the cascade so that the suction pressure required at successive jet pumps is reduced.

4 Claims, 1 Drawing Sheet

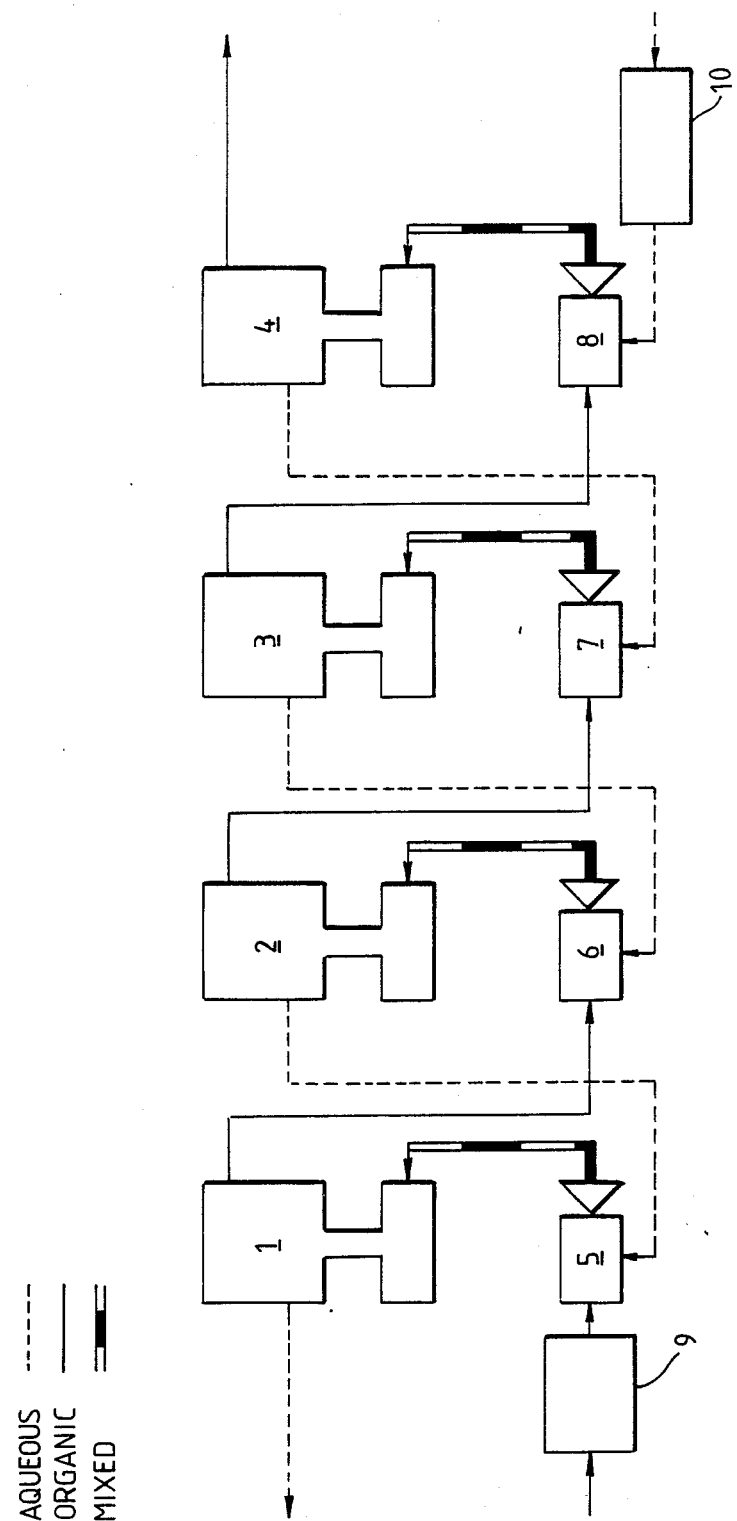

JET PUMP SYSTEM FOR FLUIDIC CONTACTOR CASCADE

The present invention concerns fluidic contactors, that is apparatus for mixing and then separating two flow streams.

BACKGROUND OF THE INVENTION

In the solvent extraction process a liquid to be treated is thoroughly mixed with an appropriate other liquid to achieve mass transfer of constituents from the liquid being treated to the other liquid, this being followed by the physical separation of the two liquids.

For practical and efficient operation it is desirable to employ a number of inter-connected contactors, termed a cascade, and preferably a cascade is arranged to provide a counter-current contact between the two liquids or phases.

To obtain a counter-current cascade it is necessary for one liquid (the minority phase) to flow against the pressure gradient created by the other liquid (the majority phase). This can be achieved using fluidic flow devices in the form of jet pumps.

A jet pump is a three port device in which an inlet or drive flow at a first port passes through a nozzle or jet to enter a co-axial diffuser section spaced from the nozzle or jet and forming an outlet port. A third port communicates with the interspace between the nozzle and diffuser with the result that flow therefrom is entrained in the flow from the nozzle to the diffuser.

It is known to arrange contactors in a countercurrent mode and to include intervening jet pumps between the contactors to assist in the counter-current flows through the cascade. As example, reference is made to U.S. Pat. Specification 4,693,822. In FIG. 5 of the reference, which discloses a cascade of four contactors, the same liquid that is the aqueous flow or the organic flow is not applied to the drive port of each jet pump in the cascade. A change-over occurs at the centre of the cascade as shown in FIG. 5 of the reference.

FEATURES AND ASPECTS OF THE INVENTION

According to the present invention there is provided apparatus for mixing and then separating flow streams which comprises a cascade of contactors and jet pumps arranged in counter-current flow mode and in which the same one flow stream is applied to the drive port of each jet pump and the other flow stream applied to the suction port of each jet pump in the cascade.

In the solvent extraction process the said one flow stream can be the organic phase and the other flow stream can be the aqueous phase. At an inlet to the cascade the organic phase can be driven by a pump, conveniently a fluidic pump, into the drive port of a first jet pump. This discharges into the first contactor of the cascade and the organic phase leaving the first contactor enters the drive port of the second jet pump. In this way the organic phase is arranged to be in excess whereby it creates high pressures on entry into the cascade and low pressures on leaving the cascade. In the counter-current mode the aqueous phase flows against this pressure gradient and this is possible by means of the jet pumps. A part of the pressure energy of the organic phase is utilized to generate a suction which is used to draw the aqueous phase through the cascade.

Whilst in the present invention the jet pumps can be the same size it is preferred to employ an expanding jet pump concept in which the jet pumps increase in size towards the low pressure end of the cascade.

DESCRIPTION OF THE DRAWING

The invention will be described further, by way of example, with reference to the accompanying drawing which is a diagrammatic representation of a cascade of contactors and jet pumps.

DESCRIPTION OF THE PREFERRED EMBODIMENT

The drawing shows a cascade of four contactors 1 to 4 inclusive and four jet pumps 5 to 8 inclusive in which the jet pumps increase in size from jet pump 5 at the high pressure end of the cascade to pump 8. The expanding jet pump option, in which the individual jet pumps grow in size towards the low pressure end of the cascade, in effect reduces the amount of suction pressure which would be necessary for each jet pump to generate. The expansion can involve increasing the diameter of the jet pump nozzle with corresponding increases in other dimensions. A pump 9, conveniently a fluidic pump which can be a single or double acting RFD pump of the kind disclosed in U.S. Pat. Specification No. 4,021,146 delivers an organic phase to the inlet or drive port of the jet pump 5. A second similar fluidic pump 10 delivers an aqueous phase to the suction port of jet pump 8. The suction port communicates with the interspace between the nozzle and diffuser sections with the result that the flow at the suction port is entrained in the flow from the nozzle to the diffuser. In the drawing, the organic phase flow is denoted by the full line, the aqueous phase flow by the dotted line and the mixed flow by the chain dotted line, the flow directions being indicated by the arrows. The contactors 1 to 4 inclusive can be of the kind the kind disclosed in U.S. Pat. Specification No. 4,693,822. Alternatively, the contactors can be hydrocyclones.

In the drawing, organic phase is delivered at the high pressure end of the cascade to the delivery or inlet Port of jet pump 5. The jet issuing from the nozzle of pump 5 entrains aqueous flow from contactor 2 delivered to the suction port of pump 5 and the mixed flow from the pump 5 proceeds to contactor 1. It must be appreciated that the jet pumps 5 to 8 inclusive, in addition to causing the phases to flow through the cascade also perform a degree of mixing of the two phases emerging at the outlet ports. The smaller aqueous flow admitted at jet pump 8 is sucked from the low pressure end to the high pressure end of the cascade by the action of the jet pumps. It is however possible to reverse the system by having the smaller flow entering at the high pressure end of the cascade. Equally, it is envisaged that in addition to liquids, the cascade can function with gases and possibly solid suspensions.

We claim:

1. Apparatus for mixing and then separating two flow streams comprising a cascade of contactors and jet pumps arranged in counter-current flow mode in which a first flow stream is applied to a drive port of each jet pump and a second flow stream is applied to a suction port of each jet pump in the cascade; said jet pumps in the cascade increasing in size from a high pressure to a low pressure end of said cascade so that the suction pressure required at successive jet pumps is reduced.

2. Apparatus according to claim 1 in which the first flow stream is an organic phase and the second flow stream is an aqueous phase.

3. Apparatus according to claim 1 including pump means for supplying the flow streams to the cascade.

4. Apparatus according to claim 3 in which the pump means comprises a fluidic pump.

* * * * *